(12) United States Patent
Park et al.

(10) Patent No.: US 11,181,173 B1
(45) Date of Patent: Nov. 23, 2021

(54) POWERTRAIN FOR ELECTRIC VEHICLE

(71) Applicants: Hyundai Motor Company, Seoul (KR); Kia Motors Corporation, Seoul (KR)

(72) Inventors: Jong Yun Park, Hwaseong-si (KR); Hang Chul Cho, Hwaseong-si (KR); Sang Bum Baek, Seoul (KR); Byung Dae Choi, Seoul (KR); Seong Eun Yun, Bucheon-si (KR); Joon Lee, Goyang-si (KR); Sung Wha Hong, Hwaseong-si (KR); Hyeon Jin Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/039,354

(22) Filed: Sep. 30, 2020

(30) Foreign Application Priority Data

Jun. 18, 2020 (KR) ........................ 10-2020-0074491

(51) Int. Cl.
*B60K 1/00* (2006.01)
*F16H 37/04* (2006.01)
*B60K 17/08* (2006.01)
*F16D 21/00* (2006.01)
*B60K 17/02* (2006.01)
(Continued)

(52) U.S. Cl.
CPC ............ *F16H 37/042* (2013.01); *B60K 1/00* (2013.01); *B60K 17/02* (2013.01); *B60K 17/08* (2013.01); *F16D 21/00* (2013.01); *B60K 2001/001* (2013.01); *F16D 11/00* (2013.01); *F16D 13/00* (2013.01); *F16D 41/00* (2013.01); *F16H 2037/049* (2013.01); *F16H 2200/0021* (2013.01); *F16H 2200/0034* (2013.01); *F16H 2200/0086* (2013.01); *F16H 2702/04* (2013.01)

(58) Field of Classification Search
CPC .......... F16H 37/042; F16H 2200/0021; F16H 2702/04; F16H 2200/0086; F16H 2037/049; F16H 2200/0034; F16H 3/54; F16H 61/02; F16D 21/00; F16D 13/00; F16D 41/00; F16D 11/00; B60K 17/02; B60K 17/08; B60K 1/00; B60K 2001/001
See application file for complete search history.

(56) References Cited

U.S. PATENT DOCUMENTS 10,350,986 B2 * 7/2019 Park .................. B60K 6/547
10,948,049 B2 * 3/2021 Yang .................. F16H 3/089
(Continued)

FOREIGN PATENT DOCUMENTS

KR 10-2012-0005101 A 1/2012

*Primary Examiner* — David J Hlavka
(74) *Attorney, Agent, or Firm* — Morgan, Lewis & Bockius LLP (57) ABSTRACT

A powertrain for an electric vehicle, may include: an input shaft and an output shaft mounted in parallel to each other; first and second power transmission mechanisms provided to transmit power from the input shaft to the output shaft at two gear ratios different from each other; a one-way clutch included in the first power transmission mechanism; a friction clutch included in the second power transmission mechanism; and a bypass mechanism provided to form a power transmission path that bypasses the one-way clutch and a power transmission path that bypasses the friction clutch.

17 Claims, 7 Drawing Sheets

(51) Int. Cl.
    *F16D 13/00*     (2006.01)
    *F16D 11/00*     (2006.01)
    *F16D 41/00*     (2006.01)

(56) References Cited

U.S. PATENT DOCUMENTS

| | | | |
|---|---|---|---|
| 2016/0003326 A1* | 1/2016 | Park | F16H 3/089 |
| | | | 74/664 |
| 2016/0003351 A1* | 1/2016 | Park | F16H 3/54 |
| | | | 475/153 |
| 2020/0003279 A1* | 1/2020 | Hara | B60K 17/02 |

* cited by examiner

POWERTRAIN FOR ELECTRIC VEHICLE

CROSS REFERENCE TO RELATED APPLICATION

The present application claims priority to Korean Patent Application No. 10-2020-0074491, filed Jun. 18, 2020, the entire contents of which is incorporated herein for all purposes by this reference.

BACKGROUND OF THE PRESENT INVENTION

Field of the Invention

The present invention relates to a powertrain for an electric vehicle, and more particularly to technology for a structure of a powertrain configured for shifting power of a motor and transmitting the shifted power to driving wheels.

Description of Related Art

Electric vehicles transmit a rotational force generated from an electric motor (hereinafter referred to simply as "motor") to driving wheels such that the vehicle is driven.

In the past, a power transmission structure in which power generated from the motor was reduced by a simple speed reducer and was transmitted to the driving wheels was mainly used. Recently, an effort has been made to lengthen a distance to empty of the vehicle by facilitating the power from the motor to be more efficiently transmitted to the driving wheels, and to improve driving performance.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a powertrain for an electric vehicle, which provides a shift ratio between an advance second speed and a reverse second speed with a relatively simple configuration, can reduce a capacity of a motor used and weight of the vehicle, can change a driving point of the motor, allows of a neutral state configured for disconnecting the motor from driving wheels, and can improve fuel efficiency of the vehicle.

In accordance with an aspect of the present invention, a powertrain for an electric vehicle includes: an input shaft to which a motor is connected; an output shaft mounted in parallel to the input shaft; a first-speed driving and a first-speed driven gear mounted on the input shaft and the output shaft to be gear-meshed with each other; a second-speed driving gear and a second-speed driven gear mounted on the input shaft and the output shaft to be gear-meshed with each other; a one-way clutch mounted on a path along which power is transmitted from the input shaft to the output shaft through the first-speed driving gear and the first-speed driven gear; a first restraint mechanism mounted to restrain free rotation of the one-way clutch; a friction clutch mounted to connect or disconnect a path along which the power is transmitted from the input shaft to the output shaft through the second-speed driving gear and the second-speed driven gear; and a second restraint mechanism mounted to restrain free rotation of the friction clutch.

The first-speed driving gear may be rotatably mounted on the input shaft through the one-way clutch; the first-speed driven gear may be mounted on the output shaft such that rotation thereof is restrained; and the one-way clutch may be mounted to transmit power from the input shaft toward the first-speed driving gear.

The second-speed driving gear may be rotatably mounted on the input shaft; the friction clutch may be provided between the input shaft and the second-speed driving gear, and the second-speed driven gear may be rotatably mounted on the output shaft.

The first restraint mechanism may include: a hub fixedly connected to the input shaft; a first clutch gear provided integrally with the first-speed driving gear; and a first sleeve linearly moving in an axial direction of the input shaft and gear-meshed with the first clutch gear while being gear-meshed with the hub.

The second restraint mechanism may include: a second clutch gear provided integrally with the second-speed driving gear; and a second sleeve linearly moving in an axial direction of the input shaft and gear-meshed with the second clutch gear while being gear-meshed with the hub.

The hub may be provided between the first-speed driving gear and the first-speed driven gear; an output gear may be provided between the first-speed driven gear and the second-speed driven gear; and the output gear may output power to a ring gear of a differential system.

In accordance with another aspect of the present invention, a powertrain for an electric vehicle includes: an input shaft and an output shaft mounted in parallel to each other; first and second power transmission mechanisms provided to transmit power from the input shaft to the output shaft at two gear ratios different from each other; a one-way clutch included in the first power transmission mechanism; a friction clutch included in the second power transmission mechanism; and a bypass mechanism provided to form a power transmission path that bypasses the one-way clutch and a power transmission path that bypasses the friction clutch.

The first power transmission mechanism may include: a first-speed driving gear which is mounted on the input shaft through the one-way clutch; and a first-speed driven gear which is gear-meshed with the first-speed driving gear and whose rotation is restrained by the output shaft.

The one-way clutch may be mounted such that the power of the input shaft is transmitted to the first-speed driving gear in a predetermined direction and the power is not transmitted in a direction opposite to the predetermined direction.

The second power transmission mechanism may include: a second-speed driving gear which is rotatably mounted on the input shaft through the friction clutch; and a second-speed driven gear which is gear-meshed with the second-speed driving gear and whose rotation is restrained by the output shaft.

The second-speed driving gear may be formed integrally with a friction disc of the friction clutch.

The bypass mechanism may include: a first dog clutch configured of selectively connecting the input shaft and the first-speed driving gear; and a second dog clutch configured of selectively connecting the input shaft and the second-speed driving gear.

The first dog clutch and the second dog clutch may share a hub fixedly mounted on the input shaft between the first-speed driving gear and the second-speed driving gear, and transmit or interrupt the power independently of each other.

The first dog clutch may include: a first clutch gear which is provided integrally with the first-speed driving gear; and a first sleeve which is provided to slide on the hub in an axial direction of the input shaft and to be gear-meshed with the first clutch gear.

The second dog clutch may include: a second clutch gear which is provided integrally with the second-speed driving gear; and a second sleeve which is provided to slide on the hub in the axial direction of the input shaft and to be gear-meshed with the second clutch gear.

An output gear for outputting a predetermined power may be mounted on the output shaft between the first-speed driven gear and the second-speed driven gear.

Various aspects of the present invention provide a shift ratio between an advance second speed and a reverse second speed with a relatively simple configuration, can reduce a capacity of a motor used and weight of a vehicle, can change a driving point of the motor, allows of a neutral state configured for disconnecting the motor from driving wheels, and can improve fuel efficiency of the vehicle.

Furthermore, without providing a separate parking mechanism, a parking function is implemented by interlocking between the input shaft and the output shaft, contributing to reducing the number of portions and weight of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 1:
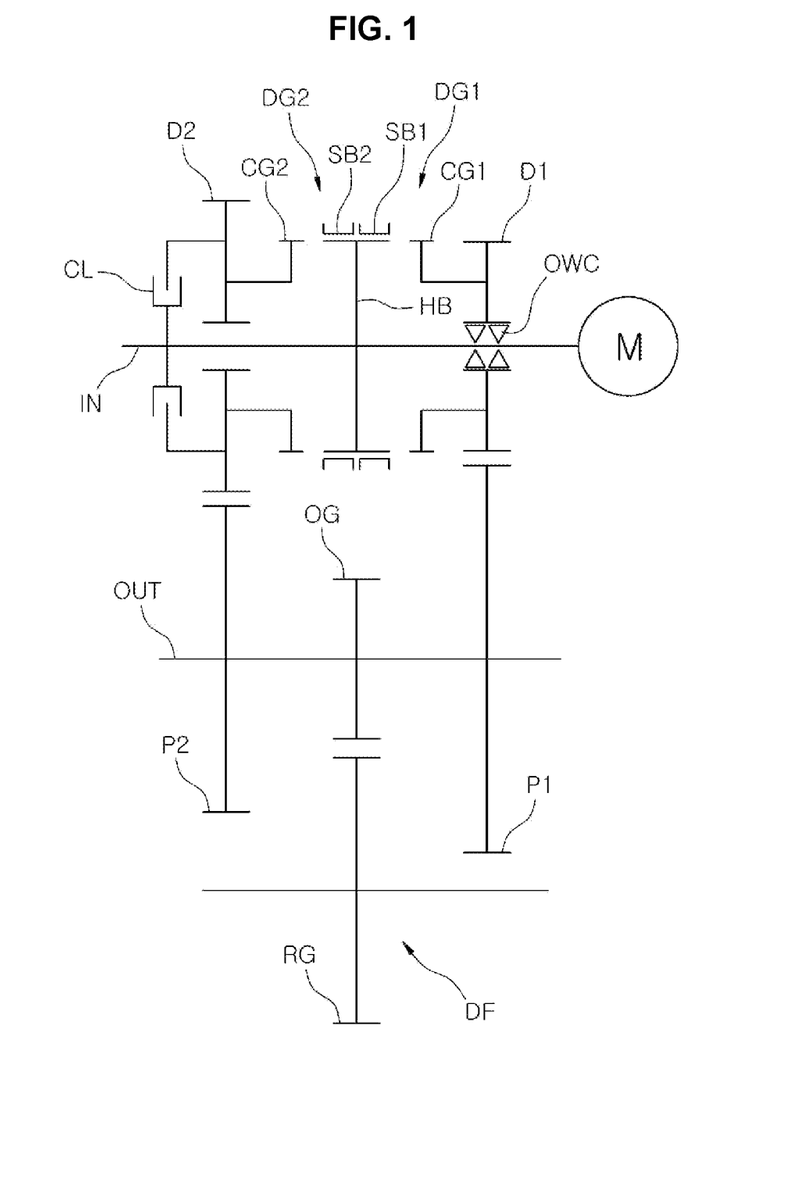
FIG. 1 is a view exemplarily illustrating a configuration of a powertrain for an electric vehicle according to various exemplary embodiments of the present invention.

Referring to FIG. 1, an exemplary embodiment of a powertrain for an electric vehicle of the present invention is configured to include: an input shaft IN to which a motor M is connected; an output shaft OUT which is mounted in parallel to the input shaft IN; a first-speed driving gear D1 and a first-speed driven gear P1 that are mounted on the input shaft IN and the output shaft OUT, respectively, to be gear-meshed with each other; a second-speed driving gear D2 and a second-speed driven gear P2 that are mounted on the input shaft IN and the output shaft OUT, respectively, to be gear-meshed with each other; a one-way clutch OWC which is mounted on a path along which power is transmitted from the input shaft IN to the output shaft OUT through the first-speed driving gear D1 and the first-speed driven gear P1; a first restraint mechanism which is configured to restrain free rotation of the one-way clutch OWC; a friction clutch CL which is configured to connect or disconnect the path along which the power is transmitted from the input shaft IN to the output shaft OUT through the second-speed driving gear D2 and the second-speed driven gear P2; and a second restraint mechanism which is configured to restrain free rotation of the friction clutch CL.

That is, the present invention includes a power transmission path that transmits power of the motor M, which is provided to the input shaft IN, to the output shaft OUT through the first-speed driving gear D1, the first-speed driven gear P1, and the one-way clutch OWC, and another power transmission path that transmits the power to the output shaft OUT through the second-speed driving gear D2, the second-speed driven gear P2, and the friction clutch CL, and is configured to restrain the free rotation of the one-way clutch OWC and the free rotation of the friction clutch CL using the first restraint mechanism and the second restraint mechanism.

A gear ratio formed by the first-speed driving gear D1 and the first-speed driven gear P1 is greater than that formed by the second-speed driving gear D2 and the second-speed driven gear P2, and thus forms a first speed which is a relatively slower changed speed, and the gear ratio formed by the second-speed driving gear D2 and the second-speed driven gear P2 forms a second speed which is a relatively faster changed speed.

In the exemplary embodiment of the present invention, the first-speed driving gear D1 is rotatably mounted on the input shaft IN through the one-way clutch OWC; the first-speed driven gear P1 is mounted on the output shaft OUT such that rotation thereof is restrained; and the one-way clutch OWC is mounted to transmit power from the input shaft IN toward the first-speed driving gear D1.

Therefore, if the input shaft IN rotates the first-speed driving gear D1 through the one-way clutch OWC, power thereof is transmitted to the output shaft OUT through the first-speed driven gear P1.

Furthermore, assuming that both the input shaft IN and the first-speed driving gear D1 are rotated together in the same direction for implementing an advance of the vehicle, the first-speed driving gear D1 may be rotated faster than the input shaft IN, but a maximum speed of the input shaft IN becomes equal to a speed of the first-speed driving gear D1.

The second-speed driving gear D2 is rotatably mounted on the input shaft IN; the friction clutch CL is located between the input shaft IN and the second-speed driving gear D2; and the second-speed driven gear P2 is mounted on the output shaft OUT such that rotation thereof is restrained.

Therefore, in a state in which the friction clutch CL is not engaged, the power of the input shaft IN is not transmitted to the output shaft OUT through the second-speed driving gear D2 and the second-speed driven gear P2. Only in the case where the friction clutch CL is engaged, the power of the input shaft IN is transmitted to the output shaft OUT through the second-speed driving gear D2 and the second-speed driven gear P2.

In the exemplary embodiment of the present invention, the first restraint mechanism is configured to include: a hub HB whose rotation is restrained by the input shaft IN; a first clutch gear CG1 which is provided integrally with the first-speed driving gear D1; and a first sleeve SB1 that linearly moves in an axial direction of the input shaft IN while maintaining a state coupled with the hub HB, and is gear-meshed with the first clutch gear CG1.

Furthermore, the second restraint mechanism is configured to include: a second clutch gear CG2 which is provided integrally with the second-speed driving gear D2; and a second sleeve SB2 that linearly moves in the axial direction of the input shaft IN while maintaining the state coupled with the hub HB, and is gear-meshed with the second clutch gear CG2.

That is, the first restraint mechanism and the second restraint mechanism may be treated as two dog clutches that use the hub HB in common, and the first sleeve SB1 and the second sleeve SB2 may be independently operated. Thus, the first sleeve SB1 is engaged with the first clutch gear CG1 and restrains the free rotation of the one-way clutch OWC, and the second sleeve SB2 is engaged with the second clutch gear CG2 and restrains the free rotation of the friction clutch CL may be independently implemented, and thus a state in which the free rotations of the one-way clutch OWC and the friction clutch CL are restrained by the first sleeve SB1 and the second sleeve SB2 can also be implemented.

As described above, the state in which the free rotations of the one-way clutch OWC and the friction clutch CL are restrained by the first sleeve SB1 and the second sleeve SB2 enables the input shaft IN and the output shaft OUT to be interlocked with each other to implement their own parking functions as will be described below.

Meanwhile, the hub HB is provided between the first-speed driving gear D1 and the first-speed driven gear P1. An output gear OG is mounted between the first-speed driven gear P1 and the second-speed driven gear P2, and outputs power to a ring gear RG of a differential system DF.

Therefore, in comparison with the case where the output gear OG is mounted outside the first-speed driven gear P1 or the second-speed driven gear P2, the output gear OG can make an axial length of the powertrain short and compact.

Meanwhile, the powertrain for an electric vehicle of the present invention as described above may be expressed as follows.

That is, the powertrain for an electric vehicle of the present invention is configured to include: an input shaft IN and an output shaft OUT that are mounted in parallel; first and second power transmission mechanisms that are provided to be configured to transmit power from the input shaft IN to the output shaft OUT at two gear ratios different from each other; a one-way clutch OWC which is mounted in the first power transmission mechanism; a friction clutch CL which is mounted in the second power transmission mechanism; and a bypass mechanism which is provided to be configured to form a power transmission path that bypasses the one-way clutch OWC and a power transmission path that bypasses the friction clutch CL.

The first power transmission mechanism is configured to include a first-speed driving gear D1 which is mounted on the input shaft IN through the one-way clutch OWC, and a first-speed driven gear P1 which is gear-meshed with the first-speed driving gear D1 and whose rotation is restrained by the output shaft OUT.

The one-way clutch OWC is mounted such that power of the input shaft IN is transmitted to the first-speed driving gear D1 and power in the opposite direction is not transmitted.

The second power transmission mechanism is configured to include a second-speed driving gear D2 which is mounted on the input shaft IN through the friction clutch CL, and a second-speed driven gear P2 which is gear-meshed with the second-speed driving gear D2 and whose rotation is restrained by the output shaft OUT.

Figure 7:
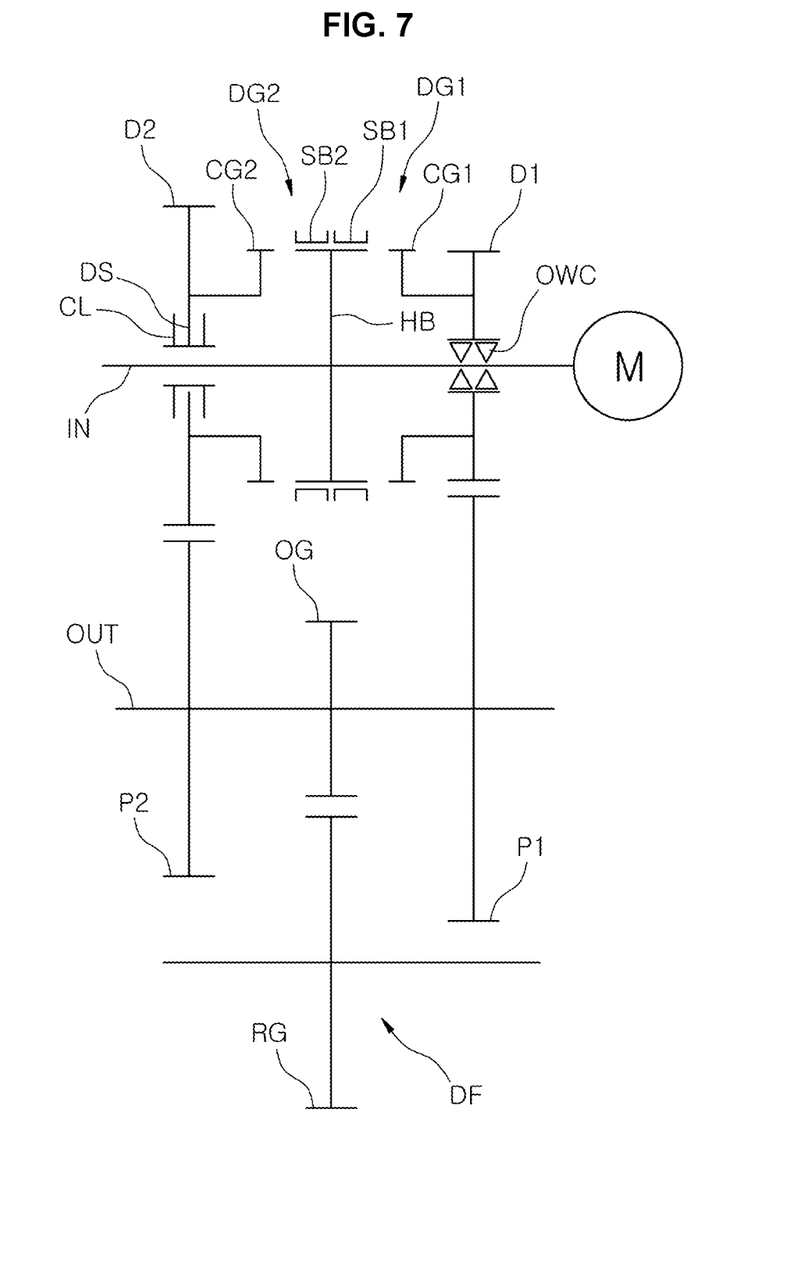
FIG. 7 is a view exemplarily illustrating a modification of the powertrain of FIG. 1.

For reference, FIG. 7 illustrates a modification of the exemplary embodiment of the present invention, and more intuitively illustrates a configuration in which the second-speed driving gear D2 is rotatably mounted on the input shaft IN through the friction clutch CL.

In the instant case, the second-speed driving gear D2 may be formed integrally with a friction disc DS of the friction clutch CL, and one portion in which the friction clutch CL is merged with the second-speed driving gear D2 and the friction clutch CL may be configured. Thus, there are advantages in that a reduction in the number of portions and a reduction in weight are possible, and moreover an axial length of the powertrain may be shortened.

The bypass mechanism is configured to include a first dog clutch DG1 which is mounted to enable connection or disconnection between the input shaft IN and the first-speed driving gear D1, and a second dog clutch DG2 which is mounted to enable connection or disconnection between the input shaft IN and the second-speed driving gear D2.

That is, the bypass mechanism may be treated as a configuration equivalent to the first restraint mechanism and the second restraint mechanism.

The first dog clutch DG1 and the second dog clutch DG2 are configured to share a hub HB, which is mounted on the input shaft IN between the first-speed driving gear D1 and the second-speed driving gear D2 in a state in which rotation of the hub HB is restrained, and to be configured to transmit or interrupt the power independently of each other.

The first dog clutch DG1 is configured to include a first clutch gear CG1 which is provided integrally with the first-speed driving gear D1, and a first sleeve SB1 which is provided on the hub HB to be configured to slide in the axial direction of the input shaft IN and to be gear-meshed with the first clutch gear CG1.

The second dog clutch DG2 is configured to include a second clutch gear CG2 which is provided integrally with the second-speed driving gear D2, and a second sleeve SB2 which is provided on the hub HB to be configured to slide in the axial direction of the input shaft IN and to be gear-meshed with the second clutch gear CG2.

An output gear OG for drawing out power between the first-speed driven gear P1 and the second-speed driven gear P2 is mounted on the output shaft OUT in a state in which rotation thereof is restrained.

Hereinafter, an operation of the exemplary embodiment of the present invention as described above will be described with reference to FIGS. 2 to 6.

For reference, the modification of FIG. 7 has the same operation as the exemplary embodiment of FIG. 1.

Figure 2:
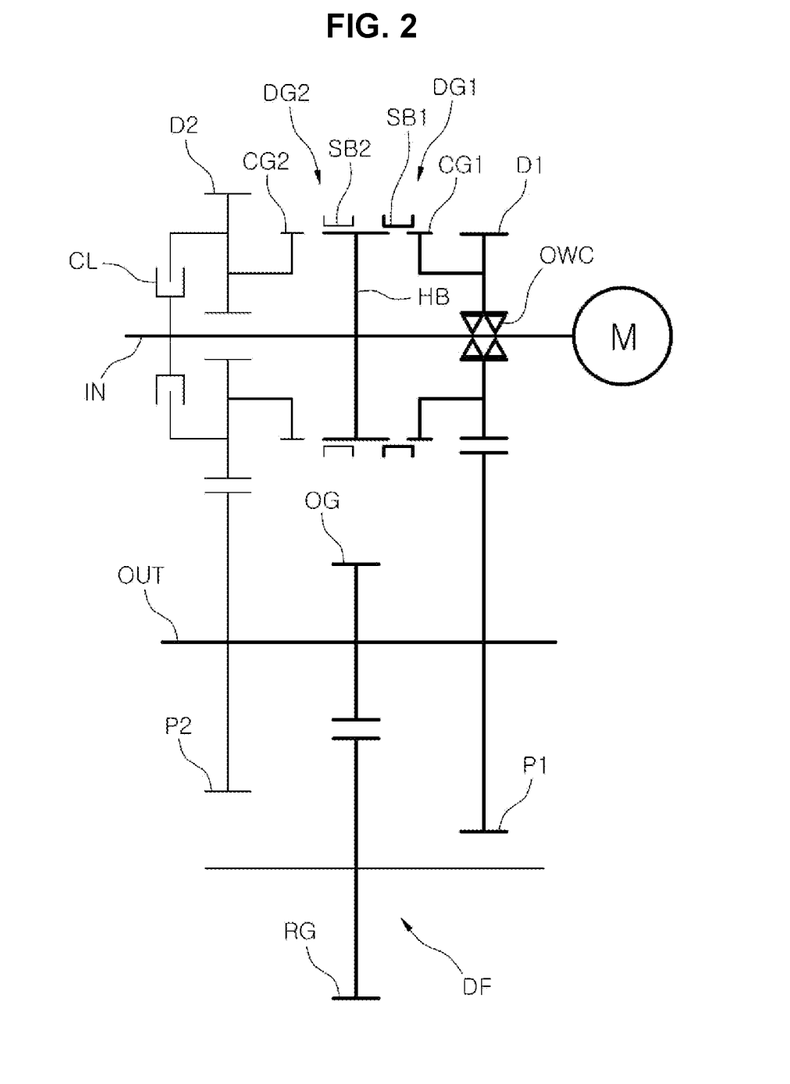
FIG. 2 is a view exemplarily illustrating a first state in which the powertrain of FIG. 1 implements a first speed.
Figure 3:
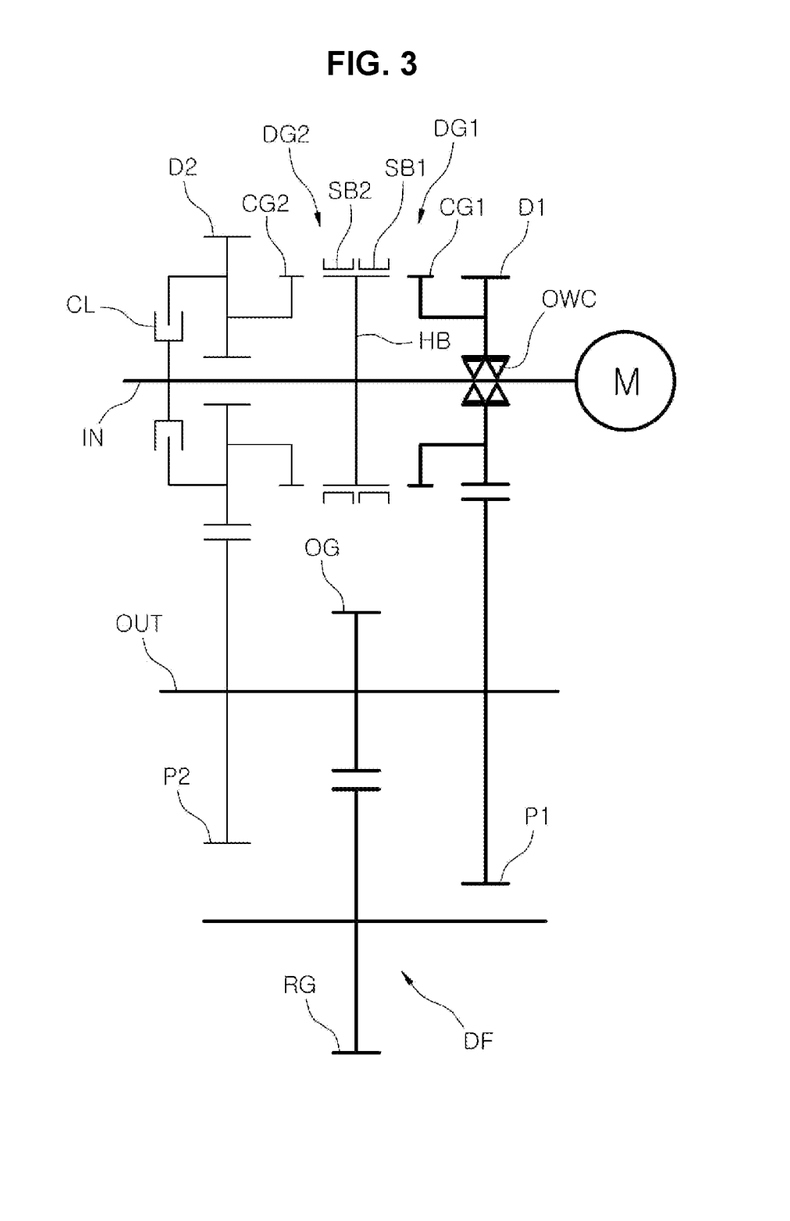
FIG. 3 is a view exemplarily illustrating a second state in which the powertrain of FIG. 1 implements the first speed.
Figure 4:
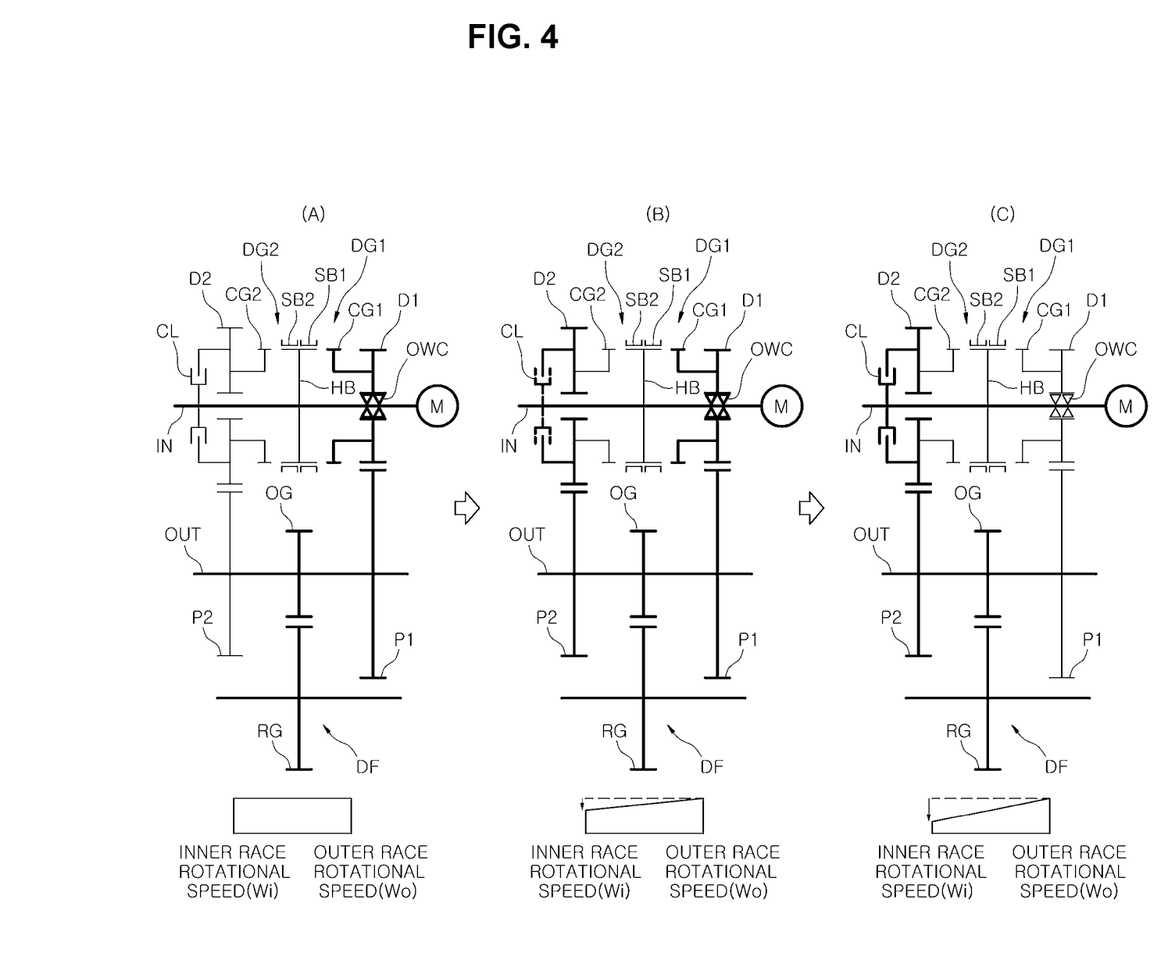
FIG. 4 is a view exemplarily illustrating a process in which the powertrain of FIG. 1 changes a first speed to a second speed.
Figure 5:
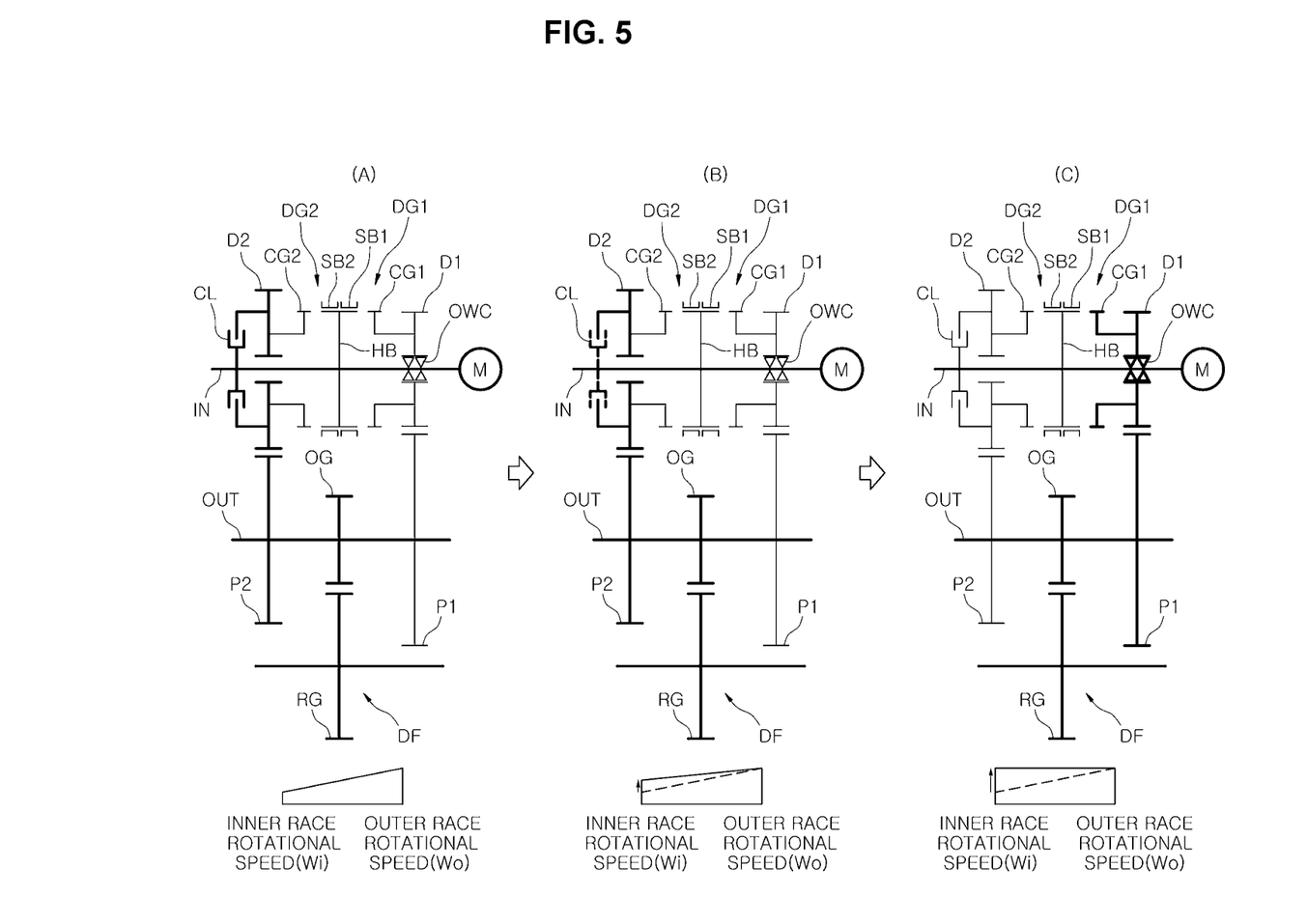
FIG. 5 is a view exemplarily illustrating a process in which the powertrain of FIG. 1 changes the second speed to the first speed.
Figure 6:
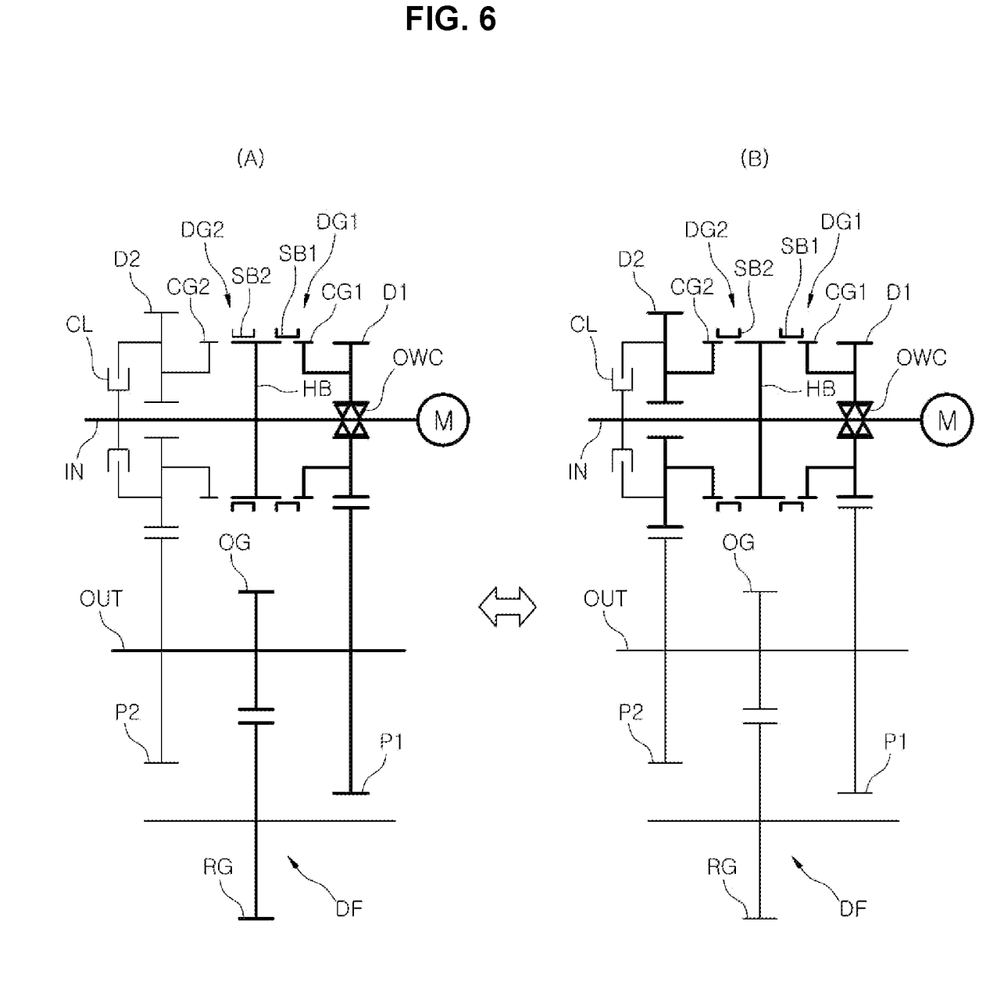
FIG. 6 is a view exemplarily illustrating how the powertrain of FIG. 1 is in a parking state.

FIG. 2 and FIG. 3 illustrate a state in which the powertrain implements a first speed, and FIG. 2 illustrates a state in which the first sleeve SB1 is gear-meshed with the first clutch gear CG1, and thus the first-speed driving gear D1 can receive a rotational force of the input shaft in both directions through the first sleeve SB1.

FIG. 3 illustrates a state in which the first sleeve SB1 is disengaged from the first clutch gear CG1, and power of the input shaft IN is transmitted to the first-speed driving gear D1 through the one-way clutch OWC, and a state in which a forward rotational force in a direction in which the input shaft IN is rotated for advance driving of a vehicle is transmitted to the first-speed driving gear D1 through the one-way clutch OWC, and a backward rotational force cannot be transmitted to the first-speed driving gear D1.

That is, a first-speed state of FIG. 2 is a state in which both an advance first speed and a reverse first speed are possible, and a first-speed state of FIG. 3 is a state in which an advance first speed may be implemented, but a reverse first speed cannot be implemented.

FIG. 4A, FIG. 4B and FIG. 4C illustrate a shifting process from a first speed to a second speed. A state of FIG. 4A is a state in which, as in FIG. 3, a first speed is implemented by the one-way clutch OWC. In the instant state, as rotation speeds of internal and external races of the one-way clutch OWC are compared together through a diagram on a lower side of FIG. 4A, a speed Wi of the internal race of the one-way clutch OWC is the same as a speed Wo of the external race of the one-way clutch OWC.

For reference, the internal race of the one-way clutch OWC is fixed to the input shaft IN, and the external race is fixed to the first-speed driving gear D1.

For a second-speed shift, as in FIG. 4B, if the friction clutch CL starts to be engaged, because a gear ratio between the second-speed driving gear D2 and the second-speed driven gear P2 is smaller than that between the first-speed driving gear D1 and the first-speed driven gear P1, the rotation speed of the input shaft IN is gradually reduced to the rotation speed of the second-speed driving gear D2, and the speed of the internal race is reduced as illustrated.

Of course, as described above, the speed of the input shaft IN is slower than that of the first-speed driving gear D1, which is allowed by the one-way clutch OWC.

If the engagement of the friction clutch CL is completed to become a state of FIG. 4C, the power of the motor is transmitted to the output shaft OUT at a second-speed shift ratio through the input shaft IN and the friction clutch CL and through the second-speed driving gear D2 and the second-speed driven gear P2, and implements second-speed traveling. The first-speed driving gear D1 is freely rotated at a speed faster than that of the input shaft IN.

As described above, at the time of the shift from the first speed to the second speed, a state in which a driving force of the motor is constantly transmitted to the output shaft OUT is maintained, a soft and silent shift is made without torque interruption only by increasing a frictional force of the friction clutch CL.

Furthermore, in the second-speed state as in FIG. 4C, if the second sleeve SB2 is engaged with the second clutch gear CG2, a traveling state of the second speed may be constantly maintained even if the friction clutch CL is disengaged. Thus, in the case of a vehicle that controls the friction clutch CL with a hydraulic pressure, as the friction clutch CL is disengaged and the second-speed state is maintained for a long time, energy consumed by a hydraulic controller may be reduced to contribute to improving fuel efficiency of a vehicle.

Furthermore, the present state is a state in which a second-speed reverse may be implemented by reverse rotation of the motor.

Meanwhile, a shift from the second speed to the first speed is described in FIG. 5A, FIG. 5B, and FIG. 5C.

That is, a state of FIG. 5A is the same as in FIG. 4C, and represents a traveling state of the second speed. The shift from the second speed to the first speed is made of as in FIG. 5B by increasing a rotation speed of the motor while disengaging the friction clutch CL.

Therefore, the speed of the internal race coupled with the input shaft IN starts to increase toward the speed of the external race.

If the friction clutch CL is completely disengaged and the speed of the motor is fully increased, the speed of the internal race becomes equal to the speed of the external race as illustrated in FIG. 5C, and the shifting to the first-speed state in which the first-speed driving gear D1 is driven from the input shaft IN through the one-way clutch OWC is completed.

Of course, if the present state is changed to the state as in FIG. 2 by operating the first sleeve SB1 to be engaged with the first clutch gear CG1, the first-speed state may be implemented while reducing a load of torque applied to the one-way clutch OWC.

Furthermore, the present state is a state in which the reverse first speed of a vehicle may be implemented by reverse rotation of the motor.

Meanwhile, FIG. 6A and FIG. 6B illustrate a parking function of the present invention.

A state of FIG. 6A is the same as the state in which the first speed of FIG. 2 is implemented, and a vehicle can stop the motor In the instant state to maintain a stop state.

To implement a parking state from the stop state as described above, if the second sleeve SB2 is engaged with the second clutch gear CG2 as illustrated in FIG. 6B, the input shaft IN and the output shaft OUT are interlocked and are not rotated, and thus the parking function of a vehicle is implemented by itself.

Thus, even without providing a parking gear and a parking sprag which may be separately provided to implement the parking function in the past, the parking function is implemented as described above, the number of portions and weight may be reduced to contribute to improving fuel efficiency of a vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A powertrain apparatus for a vehicle, the powertrain apparatus including:
    an input shaft to which a power source is connected;
    an output shaft mounted in parallel to the input shaft;
    a first-speed driving and a first-speed driven gear mounted on the input shaft and the output shaft, respectively, to be gear-engaged with each other;
    a second-speed driving gear and a second-speed driven gear mounted on the input shaft and the output shaft, respectively, to be gear-engaged with each other;
    a one-way clutch mounted on a path along which power of the power source is transmitted from the input shaft to the output shaft through the first-speed driving gear and the first-speed driven gear;
    a first restraint mechanism mounted in parallel with the one-way clutch to restrain free rotation of the one-way clutch;
    a clutch mounted to selectively connect a path along which the power is transmitted from the input shaft to the output shaft through the second-speed driving gear and the second-speed driven gear; and
    a second restraint mechanism mounted to restrain free rotation of the clutch.

2. The powertrain apparatus according to claim 1,
    wherein the first-speed driving gear is rotatably mounted on the input shaft through the one-way clutch;
    wherein the first-speed driven gear is fixedly mounted on the output shaft; and
    wherein the one-way clutch is mounted to transmit the power from the input shaft through the first-speed driving gear.

3. The powertrain apparatus according to claim 2,
    wherein the second-speed driving gear is rotatably mounted on the input shaft,
    wherein the clutch is mounted between the input shaft and the second-speed driving gear, and
    wherein the second-speed driven gear is fixedly mounted on the output shaft.

4. The powertrain apparatus according to claim 3, wherein the first restraint mechanism includes:
    a hub fixedly connected to the input shaft;
    a first clutch gear fixedly mounted with the first-speed driving gear; and
    a first sleeve configured of linearly moving in an axial direction of the input shaft and selectively engaged with the first clutch gear while being engaged with the hub.

5. The powertrain apparatus according to claim 4, wherein the second restraint mechanism includes:
    a second clutch gear fixedly mounted with the second-speed driving gear; and
    a second sleeve configured of linearly moving in an axial direction of the input shaft and selectively engaged with the second clutch gear while being engaged with the hub.

6. The powertrain apparatus according to claim 5,
    wherein the hub is mounted between the first-speed driving gear and the first-speed driven gear;
    wherein an output gear is fixedly mounted on the output shaft between the first-speed driven gear and the second-speed driven gear; and
    wherein the output gear is gear-engaged to a ring gear of a differential system to output a predetermined power.

7. The powertrain apparatus according to claim 6, wherein the power source is a motor.

8. A powertrain apparatus for a vehicle, the powertrain apparatus comprising:
    an input shaft and an output shaft mounted in parallel to each other;
    first and second power transmission mechanisms mounted to transmit power from the input shaft to the output shaft at two gear ratios different from each other;
    a one-way clutch included in the first power transmission mechanism;
    a clutch included in the second power transmission mechanism; and
    a bypass mechanism mounted in parallel with the one-way clutch and the clutch to form a first power transmission path that bypasses the one-way clutch and a second power transmission path that bypasses the clutch.

9. The powertrain apparatus according to claim 8, wherein the first power transmission mechanism includes:
    a first-speed driving gear which is mounted on the input shaft through the one-way clutch; and
    a first-speed driven gear which is gear-engaged with the first-speed driving gear and fixedly connected to the output shaft.

10. The powertrain apparatus according to claim 9, wherein the one-way clutch is mounted so that the power of the input shaft is transmitted to the first-speed driving gear in a predetermined direction and the power is not transmitted in a direction opposite to the predetermined direction.

11. The powertrain apparatus according to claim 9, wherein the second power transmitting apparatus mechanism includes:
    a second-speed driving gear which is rotatably mounted on the input shaft through the clutch; and
    a second-speed driven gear which is fixedly mounted on the output shaft and gear-engaged with the second-speed driving gear.

12. The powertrain apparatus according to claim 11, wherein the second-speed driving gear is formed integrally with a friction disc of the clutch.

13. The powertrain apparatus according to claim 11, wherein the bypass mechanism includes:
    a first dog clutch configured of selectively connecting the input shaft and the first-speed driving gear; and
    a second dog clutch configured of selectively connecting the input shaft and the second-speed driving gear.

14. The powertrain apparatus according to claim 13, wherein the first dog clutch and the second dog clutch share a hub fixedly mounted on the input shaft between the first-speed driving gear and the second-speed driving gear, and transmit or interrupt the power independently of each other.

15. The powertrain apparatus according to claim 14, wherein the first dog clutch includes:
   a first clutch gear which is fixedly mounted with the first-speed driving gear; and
   a first sleeve which is slidably mounted on the hub in an axial direction of the input shaft and configured to be selectively engaged with the first clutch gear.

16. The powertrain apparatus according to claim 15, wherein the second dog clutch includes:
   a second clutch gear which is fixedly mounted with the second-speed driving gear; and
   a second sleeve which is slidably mounted on the hub in the axial direction of the input shaft and configured to be selectively engaged with the second clutch gear.

17. The powertrain apparatus according to claim 16, wherein an output gear for outputting a predetermined power is mounted on the output shaft between the first-speed driven gear and the second-speed driven gear.

\* \* \* \* \*